Nov. 7, 1967  N. R. HAINES  3,351,076
VEHICLE WASHER

Filed July 26, 1965  2 Sheets-Sheet 1

INVENTOR.
NORMAN R. HAINES
BY Whittemore,
Hulbert & Belknap
ATTORNEYS

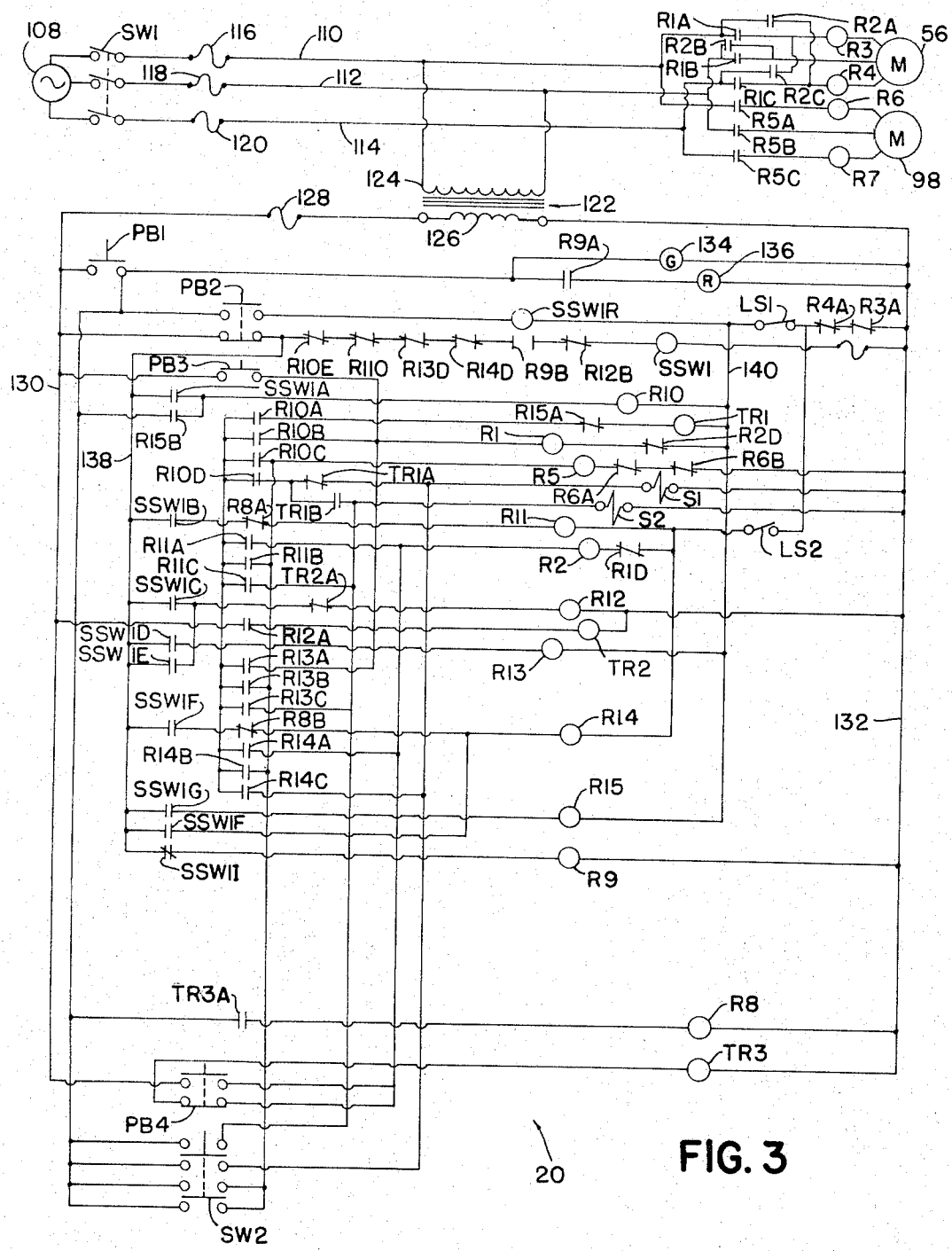

United States Patent Office 3,351,076
Patented Nov. 7, 1967

3,351,076
VEHICLE WASHER
Norman R. Haines, Ann Arbor, Mich., assignor to Canomac Corporation, Ann Arbor, Mich., a corporation of Michigan
Filed July 26, 1965, Ser. No. 474,889
6 Claims. (Cl. 134—58)

ABSTRACT OF THE DISCLOSURE

The vehicle washer comprises a spray frame reciprocable vertically between upper and lower limits, having means for supplying either rinse water or a washing solution to the spray frame during its movement. Rinse water is sprayed on the vehicle during the first downward movement of the spray frame, and a washing solution is sprayed during the following upward movement. Means are provided for switching from rinse water to the washing solution toward the end of the first downward movement of the spray frame so as to clear the rinse water from the spray frame by the time it reaches its lower limit. Means are provided for adjusting the upper limit of spray frame travel to wash vehicles of varying height. FIGURE 4 shows the washing cycle in which the spray frame moves down to rinse in a first phase, then up to wash in a second phase, then down to wash in a third phase, and then up, down, and up in three final rinsing phases. There is a time delay after each washing phase to permit the washing solution to penetrate the dirt.

---

The invention relates to washing apparatus and refers more specifically to automatic apparatus for washing motor vehicles and the like including an improved cycle of operation, means for changing from rinse water to cleaning solution during a phase of the cycle of operation and means for adjusting the height of operation of the washing apparatus.

In the operation of vehicle washing apparatus as disclosed in prior United States Patent No. 3,088,472, the disclosure of which is incorporated herein by reference, it has been found that a single initial rinsing phase in a cycle of operation of the washing apparatus without a time delay between the rinsing phase and a first cleaning phase is all that is necessary. In addition an additional cleaning phase and a pause thereafter have been found to produce a more efficient washing cycle.

Further, it is desirable in vehicle washing apparatus of the type described in the above referenced patent wherein switching between rinse water and a cleaning solution is required between phases in a cycle of operation, that either a pause be provided between the phases of the cycle of operation wherein the switching is accomplished or switching be initiated before the end of the rinse water phase. Thus if the switching is to provide the desired cleaning solution at the beginning of a cleaning phase in the cycle of operation of the vehicle washing apparatus the switching must be accomplished during the preceding phase of the operation to give the pipes of the cleaning apparatus time to be drained of the rinse water of the preceding phase.

Also, with prior automatic vehicle washing apparatus the height to which the spray frame travels has been controlled so that if the washing apparatus were capable of washing very high trucks a considerable portion of the washing cycle would be lost when washing low trucks or automobiles. Similarly, if these prior washing apparatus are set to provide efficient operation in conjunction with low trucks and automobiles, a high truck could not be washed in the washing apparatus.

It is therefore one of the objects of the present invention to provide improved apparatus for automatic vehicle washing.

Another object is to provide an improved method of automatic vehicle washing.

Another object is to provide an automatic vehicle washer including means for first rinsing the vehicle with rinse water, means for subsequently spraying the vehicle with a cleaning solution, means for then providing a time delay, means for spraying the vehicle with a cleaning solution a second time, means for then providing a second time delay, and means for subsequently providing three water rinses for the vehicle.

Another object is to provide automatic means for washing a vehicle as set forth above including means for changing the rinsing solution to a cleaning solution before the end of the first rinsing phase of a vehicle washing cycle.

Another object is to provide vehicle washing apparatus as set forth above and further including means for adjusting the height of movement of the spray frame thereof.

Another object is to provide a method of operation of an automatic vehicle washer including first rinsing a vehicle with rinse water, subsequently spraying the vehicle with a cleaning solution, then providing a time delay, spraying the vehicle with a cleaning solution a second time, then providing a second time delay, and subsequently providing three water rinses for the vehicle.

Another object is to provide a method of washing a vehicle as set forth above and including changing the rinsing solution to a cleaning solution before the end of the first rinsing phase of a vehicle washing cycle.

Another object is to provide a method of washing a vehicle as set forth above and further including adjusting the height of movement of the spray frame of the vehicle washing apparatus.

Another object is to provide apparatus for and a method of washing a vehicle which is simple, economical and efficient.

Other objects and features of the invention will become apparent as the description proceeds, especially when taken in conjunction with the accompanying drawings, illustrating a preferred embodiment of the invention, wherein:

FIGURE 3 is an electric schematic diagram of the vehicle washing apparatus illustrated in FIGURES 1 and 2.

Figure 1:
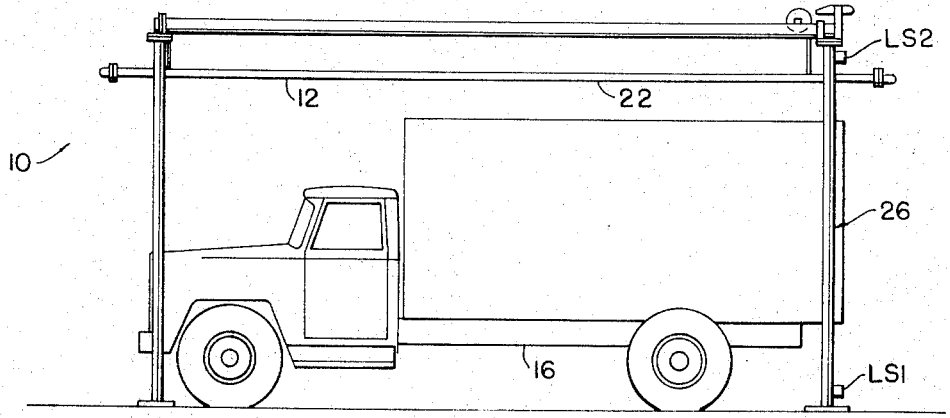
FIGURE 1 is an elevation view of vehicle washing apparatus constructed in accordance with the invention and showing a truck positioned therein.
Figure 2:
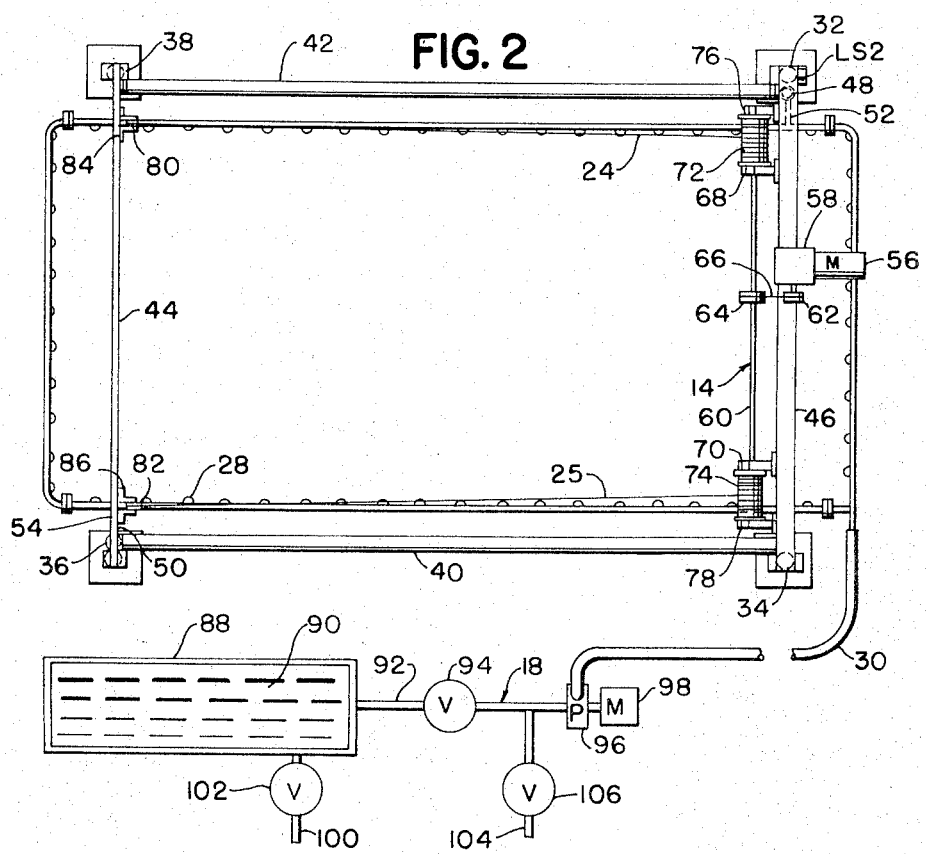
FIGURE 2 is a top view of the vehicle washing apparatus illustrated in FIG. 1.
Figure 4:
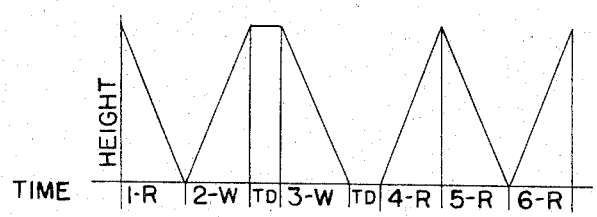

FIGURE 4 is a diagrammatic representation of the separate phases in a vehicle washing cycle of the vehicle washing apparatus illustrated in FIGURES 1 and 2 as controlled in accordance with electric control circuit schematic diagram illustrated in FIGURE 3 wherein cycle time is plotted on a horizontal base and spray frame height is indicated vertically with the rinse, wash and time delay phases and portions of the cycle being indicated by the abbreviations R, W and TD, respectively.

With the particular reference to the figures of the drawings, one embodiment of the present invention will now be considered in detail.

The vehicle washing apparatus 10, as shown in FIGURES 1 and 2, includes a spray frame 12 which may be raised and lowered by means of the hoisting apparatus 14 supported on the stationary frame 26. Fluid supply and control apparatus 18 for providing rinse water and cleaning solution to spray frame 12 during movement of the frame 12 up and down in response to the electric control circuit schematic 20, illustrated in FIGURE 3, is also a part of the vehicle washing apparatus 10.

In operation, the spray frame 12 is lowered and raised between the limiting upper position in which it is shown and a lower limiting position below the bottom of the vehicle to be washed a plurality of times so that the entire vehicle is washed in a plurality of separate phases. In the separate phases, rinse water is first applied to the vehicle, followed by two separate sprayings with a cleaning solution, after each of which there is a pause in the cycle of operation of the vehicle washing apparatus. Subsequent to the pause after the second spraying with cleaning solution, three separate water rinse phases are provided in the improved cycle of operation of the vehicle washing apparatus 10. The height to which the spray frame 12 is raised during a cycle of operation of the vehicle washing apparatus 10 is adjustable as is the time of switching between rinse water and cleaning solution.

More specifically the spray frame 12 is a pipe 22 constructed in a closed rectangular configuration which is supported on the cables 24 of the hoisting apparatus 14 for vertical movement with respect to the stationary frame 26 and the truck 16 which the pipe 22 is dimensioned to surround. A plurality of inwardly directed nozzles 28 are provided around the inner periphery of the pipe 22 through which jets or sprays of fluid are directed towards the truck 16 from the pipe 22. The pipe 22 is hydraulically connected by means of the flexible cable 30 to the fluid supply and control apparatus 18.

The stationary frame 26 includes the vertical corner posts 32, 34, 36 and 38. The longitudinally extending connecting members 40 and 42 and the transversely extending connecting members 44 and 46 are also included in the stationary frame 26. A pair of guide rods 48 and 50 are positioned adjacent and extend parallel to the corner posts 32 and 36 and are secured to the spray frame 12 by means of rigid lateral extensions 52 and 54 on the spray frame 12.

The lateral extensions 52 and 54 on the spray frame 12 guide the vertical movement of the spray frame by means of a loop or eye in the outer end thereof positioned over the guide rods 48 and 50. A lower and upper limit switch LS1 and LS2 designed to be open when the spray frame 12 is in a lower and upper position respectively are secured to the corner post 32 and may be actuated by the lateral extension 52 or other similar projection on the spray frame 12 during vertical movement thereof.

The hoisting apparatus 14 includes the motor 56, gear reducer 58 and shaft 60 with the coupling pulleys 52 and 64 and belt 66 driving the shaft 60 from the gear reducer 58 on actuation of the hoist motor 56 in opposite directions. The motor 56 and gear reducer 58 may be supported directly on the transverse connecting member 46 of the stationary frame 26 while the shaft 60 is rotatably supported in brackets 68 and 70 connected to the connecting member 46.

The hoisting apparatus 14 further includes the drums 72 and 74 connected between the bracket 68 and bracket 76 and brackets 70 and 78 respectively for rotation with shaft 60, as shown in FIGURE 2. The cables 24 and 25 are wound on drums 72 and 74 respectively and pass over pulleys 80 and 82 supported on brackets 84 and 86 respectively which in turn are connected to the connecting member 44 at the opposite end of the stationary frame 26, as shown best in FIGURE 2. The opposite ends of each of the cables are connected to the opposite ends of the spray frame 12 at the respective sides thereof and the cables 24 and 25 are so wound on the drums 72 and 74 that both ends thereof will be simultaneously wound on or unwound from the drums 72 and 74 depending on the direction of operation of the reversible hoisting apparatus motor 56 to lower or raise both ends of the spray frame 12 equally and simultaneously.

The fluid supply and control apparatus 18 includes a reservoir 88 for storage of a cleaning solution, such as a soap and water solution 90. The reservoir 88 is connected to the flexible hose 30 through a conduit 92, a solenoid operated valve 94 and pump 96 driven by pump motor 98. Thus a soap and water solution is delivered to the spray frame 12 on actuation of the motor 98 when valve 94 is open. A conduit 100 is connected to a City water supply and supplies water to the cleaning solution reservoir 88 on opening of the solenoid operated valve 102 which is positioned in the conduit 100. A similar conduit 104 is connected into the conduit 92 downstream of the solenoid operated valve 94, as shown in FIGURE 2 to supply rinse water from a City water supply to the spray frame 12 on opening of the solenoid operated valve 106 connected therein with the valve 94 closed and motor 98 energized.

The electric control circuit 20 will be considered in conjunction with the over-all operation of the vehicle washing apparatus 10.

The electric control circuit 20 is energized from a source of three phase, sixty cycle, alternating electric energy 108 over the conductors 110, 112 and 114 through fuses 116, 118 and 120, respectively. The conductors 110, 112 and 114 energize the three phase hoist motor 56 through the relay contacts R1A, R1B and R1C which are closed when the relay coil R1 is energized to drive the hoist motor in a direction to move the spray frame in a down direction. The motor 56 is energized through the relay contacts R2A, R2B and R2C when the relay coil R2 associated with movement of the spray frame in an up direction is energized.

The over-load relays R3 and R4 are provided in the branches of the conductors 110 and 114 leading to the motor 56 and serve to open the hoist motor over-load relay contacts R3A and R4A when the load on the motor 56 is excessive.

The pump motor 98 is energized from the conductors 110, 112 and 114 on closing the pump motor relay contacts R5A, R5B and R5C which is accomplished on energization of the pump relay coil R5. The pump motor is similarly provided with a pair of over-load relays R6 and R7 operable to open the over-load relays contacts R6A and R6B when the load on the pump motor is excessive.

The electric control circuit 20 is energized by means of the transformer 122 having a primary windign 124 connected across the conductors 110 and 112 of the three phase supply line and a secondary winding 126 operable to provide a one hundred ten volt alternating single phase signal through fuse 128. The conductors 130 and 132 are therefore provided with a voltage of one hundred ten volts thereacross at any time the three pole, single throw switch SW1 in the three phase power line is closed.

With the switch SW1 closed, the push button switch PB1 is closed to provide an indication of power-on through illumination of the green light 134 connected across the conductors 130 and 132.

An automatic cycle of the vehicle washing apparatus 10 is then started with the spray frame 12 in an upper position, as shown in FIGURE 1, so that the limit switch LS2 is open and the limit switch LS1 is closed by closing the spring returned push button switch PB2 for a short time.

Closing the switch PB2 will energize the reset relay coil SSW1R of the stepping switch SSW1 to provide a signal which will step the stepping switch SSW1 from a nine position thereof back to a one position. Thus, the relay coil R9 which has previously been energized due to the closing of the contacts SSW1I with the stepping switch in the ninth position thereof will be deenergized so that the relay contacts R9A will return to a closed position and the red light 136 will be illuminated, indicating a cycle of operation of the vehicle washing apparatus 10 is underway and the relay contacts R9B will be closed.

Stepping the stepping switch SSW1 into the one position will close the contacts SSW1A to energize the relay coil R10 which is connected between the conductors 138 and 140 which are in turn connected to the conductors 130 and 132, respectively, through the lower portion of the push button switch PB2 which is now returned to the position illustrated in FIGURE 3 and through the limit switch LS1 and the hoist overload relay contacts R4A and R3A.

Energizing the relay coil R10 will close the relay contacts R10A, R10B, R10C and R10D and open relay contacts R10E. Opening contacts R10E will prevent stepping of switch SSW1 due to closing of contacts R9B. Closing the relay contacts R10A will energize the timing relay TR1 through the normally closed contacts R15A. Closing the contacts R10B will energize the motor relay coil R1 through the normally closed motor relay contacts R2D to close motor relay contacts R1A, R1B and R1C and open relay contacts R1D to drive the hoist motor 56 in a direction to move the spray frame 12 down and to prevent energization of motor relay R2. Closing relay contacts R10C will energize the motor relay coil R5 through pump overload relay contacts R6A and R6B to close the contacts R5A, R5B and R5C to energize the pump motor 98. The closing of the relay contacts R10D will energize the solenoid S1 for opening the water valve 106 through the normally closed timing relay contacts TR1A. After the timing relay TR1 times out the timing relay contacts TR1B will be closed and the timing relay contacts TR1A will be opened so that the solenoid S2 for actuating the solenoid actuated cleaning solution valve 94 will be energized.

The timing relay TR1 is set to time out at approximately the time that the spray frame 12 has moved down to the headlight level of the truck 16. Thus, at the end of the down travel of the spray frame 12, the water provided through valve 106 to the spray frame 12 will be entirely out of the spray frame 12 and the flexible coupling 30 leading thereto and the soap and water cleaning solution 90 will be ready to be discharged from the spray frame 12 having been fed thereto through the solenoid operated valve 94.

When the spray frame 12 reaches the bottom of its travel the limit switch LS1 will be opened. Opening of the limit switch LS1 will deenergize the relay coil R10 and each of the relay contacts R10A, R10B, R10C and R10D will be opened to stop the operation of the motor 56, to shut off the pump motor 98 and to cause the now open valve 94 to be closed. Also, deenergizing the relay R10 will cause relay contacts R10E to close, again providing a stepping signal for the stepping switch SSW1 so that it will step into the position two, whereby the contacts SSW1B are closed.

Closing the contacts SSW1B will cause the relay coil R11 to be energized through the now closed limit switch LS2 which is open only when the spray frame 12 is in the upper limiting position, as shown in FIGURE 1, and the normally closed contacts R8A which will be considered subsequently. Energizing the relay coil R11 will cause the relay contacts R11A, R11B and R11C to close and will cause the relay contacts R11D to open.

Closing the relay contacts R11A will energize the relay coil R2, closing the relay contacts R2A, R2B and R2C to energize the hoist motor to drive the spray frame 12 in an up direction. The relay contacts R2D are opened at this time to prevent simultaneous closing of the contacts R1A, R1B and R1C to short the hoist motor 56.

The contacts R11B when closed again energize the pump motor relay R5 to actuate the pump motor 98. Closing the contacts R11C will energize the solenoid S2, opening the valve 94. Thus, the soap and water cleaning solution is sprayed from the nozzles 28 onto the truck 16 as the spray frame is raised from its lower position to its upper position in the second phase of operation of the vehicle washing apparatus 10, as indicated in FIGURE 4.

When the spray frame 12 reaches an upper position the limit switch LS2 will be opened deenergizing the relay R11 and thus opening the contacts R11A, R11B and R11C and closing the relay contacts R11D to again provide the stepping switch SSW1 with a stepping signal so that the switch SSW1 switches into its third position and the contacts SSW1C close.

Closing of the contacts SSW1C will energize the relay coil R12 to close the contacts R12A and thus energize the timing relay coil TR2 so that after a predetermined time the timing relay contacts TR2A will be opened and the relay coil R12 will be deenergized. Thus, there is a pause in the vehicle washing cycle after the first spraying of the vehicle with a soap and water solution.

Energizing the relay coil R12 will also open the relay contacts R12B. Deenergizing the relay coil R12 will close the relay contacts R12B and the stepping switch SW1 is thus provided with another stepping signal a predetermined time, which may be set by the timing relay TR2, after the end of the second phase of the cycle of operation of the vehicle washing apparatus 10. The stepping switch SSW1 will be stepped into the fourth position thereof on closing of the relay contacts R12B to close the contacts SSW1D and energize the relay coil R13.

Energizing the relay coil R13 will close the relay contacts R13A, R13B and R13C and open contacts R13D. Thus again the relay coil R1 is energized so that the motor 56 will be driven in a direction to lower the spray frame 12. The relay R5 will be energized to actuate the pump 98 and the solenoid S2 will again be energized to open the valve 94 whereby a third phase of the vehicle washing cycle is initiated with the spray frame 12 travelling down and a soap and water solution being sprayed on the truck 16. Again, when the spray frame 12 reaches its lowermost position, the limit switch LS1 will be opened to deenergize the relay coil R13 and close the contacts R13D to step the stepping switch SSW1 into its fifth position, closing the contacts SSW1E.

Closing the relay contacts SSW1E will again energize the relay R12. Energizing the relay R12 will provide a second time delay after the second spraying of the truck 16 with a soap and water solution on movement of the spray frame in down direction the length of which is again determined by the setting of timing relay TR2. After the predetermined time delay the closing of the contacts R12B will again cause the stepping switch SSW1 to step into the sixth position thereof, whereby the contacts SSW1F are closed.

Closing the contacts SSW1F will energize the relay coil R14 through normally closed relay contacts R8B which will be considered in detail subsequently whereby the relay contacts R14A, R14B, and R14C are closed and the relay contacts R14D are opened. Thus the relays R2 and R5 and the solenoid S1 are energized to cause the spray frame to be moved upward in a fourth phase of the cycle of the operation of the vehicle washing apparatus 10 which is a water rinse phase. Again, as the spray frame 12 reaches its upper limiting position, the limit switch LS2 is caused to open to deenergize the relay coil R14, close the relay contacts R14D, and step the stepping switch SSW1 into the seventh position thereof, whereby the contacts SSW1G are closed to energize the relay coil R15.

Energizing the relay coil R15 will close the contacts R15B and open the contacts R15A. Closing the relay contacts R15B will again energize the relay coil R10 to close the relay contacts R10A, R10B, R10C, and R10D and open the relay contacts R10E. Thus, the spray frame 12 will be caused to move in a down direction, again spraying rinse water on the truck 16 in the fifth phase of a cycle of operation of the vehicle washing apparatus 10. The contacts R15A prevent operation of the timing relay TR1 as before so that the rinse water solenoid S1 will not be switched off and the cleaning solution solenoid S2 energized at a predetermined time in the fifth phase of the cycle of the washing apparatus 10 as in the first phase thereof.

As the spray frame 12 reaches its lower limit, the limit switch LS1 is again opened to deenergize the relay coil R10, closing the relay contacts 10E and stepping the stepping switch SSW1 into the eighth position thereof. In the eighth position of the stepping switch SSW1 the contacts SSW1F are closed so that the relay coil R14 is again energized as before to close the contacts R14A, R14B and R14C and to open the contacts R14D.

The last or sixth phase of the cycle of operation of the washing apparatus 10 is thus accomplished with the spray frame moving in an up direction and spraying rinse water on the vehicle. Again when the spray frame 12 reaches the upper limit thereof the limit switch LS2 is opened so that the relay coil R14 is deenergized, the hoist motor and the pump motor are deenergized and the solenoid 105 is deenergized. Also, at this time the stepping switch SSW1 is actuated due to the closing of the contacts R14D so that the stepping switch SSW1 is stepped into the ninth position thereof from which it started closing the contacts SSW1I again and energizing the relay R9 to open the contacts R9A whereby the red light 136 is deenergized, indicating the end of a complete cycle of operation. The contacts R9B are opened again at the same time as the contacts R9A are opened. No further action will be accomplished in the electric control circuit 20 until the start button PB2 is again pushed to start a second cycle of the vehicle washing apparatus.

If it is desired to run the spray frame in a down direction without the pump motor and solenoids S2 and S1 being energized, such operation is possible on pressing push button PB3 to energize the relay R1 through contacts R2D, limit switch LS1, relay contacts R4A and R3A. The spray frame 12 may be moved in an up direction by depressing the push button PB4 whereby the relay coil R2 is energized through contacts R1D, limit switch LS2 and contacts R4A and R3A. The relay coil R2 is energized through the upper portion of push button PB4.

Similarly, if it is desired to manually actuate the vehicle washing apparatus 10 by means of the electric control circuit 20 to provide either water or cleaning solution from the spray frame 12, the 3-position switch SW2 may be actuated. In the lower position thereof the relay coil R5 is energized through the lower portion of the switch SW2 to actuate the pump motor 98. At the same time the solenoid S1 is energized through the upper portion of switch SW2 to open the water valve 106. With the switch in a center or neutral position, as shown in FIGURE 3, both of the solenoids S1 and S2 are deenergized and the pump motor 98 is deenergized. With the switch SW2 in an up position, the lower portion of the switch again energizes the relay R5 while the upper portion of the switch energizes the solenoid S2 to open the valve 94.

In addition it will be seen that the timing relay TR3 is energized through the lower portion of the push button PB4 at any time the motor relay R2 is energized to connect the hoist motor 56 for movement in an up direction. When the timing relay TR3 times out the relay contacts TR3A are closed to energize relay coil R8. Energizing relay coil R8 will open previously indicated relay contacts R8A and R8B to respectively deenergize relay coils R11 and R14.

Thus with the spray frame 12 moving in an up direction the height to which the spray frame 12 may be moved will be limited by the setting of the timing relay TR3. The cycle of the vehicle washing apparatus 10 may thus be adjusted to permit efficient washing of high or low vehicles by adjusting the setting of the timer TR3 so that the limit switch LS2 is not contacted at the upper limit of the travel of the spray frame 12.

While one embodiment of the present invention has been disclosed in detail, it will be understood that other embodiments thereof are contemplated. It is the intention to include all such modifications and embodiments as are defined by the appended claims within the scope of the invention.

What I claim as my invention is:

1. A vehicle washer comprising a spray device, power means for reciprocating said spray device in opposite directions between limits to spray a vehicle, first means for supplying a first liquid to said spray device during a first portion of its movement toward one limit, second means for supplying a second liquid to said spray device during the remaining portion of its movement toward said one limit and during its subsequent movement from said one limit, and means for automatically deactuating said first supply means and actuating said second supply means at an intermediate point in the movement of said spray device toward said one limit.

2. The vehicle washer defined in claim 1, wherein a single liquid supply conduit leads to said spray device, and said first and second supply means are connected to said conduit.

3. The vehicle washer defined in claim 1, wherein said intermediate point is spaced from said one limit a distance sufficient to enable the first liquid to be discharged from said spray device by the time said spray device reaches said one limit.

4. The vehicle washer defined in claim 1, wherein said spray device is a horizontal, rectangular frame having inwardly directed spray nozzles and reciprocated up and down by said power means.

5. The vehicle washer defined in claim 1, including adjustable means for determining the limit of movement of said spray device away from said one limit and for automatically reversing the same, and additional means overriding said adjustable means for providing a maximum limit of movement of said spray device away from said one limit and for automatically reversing the same.

6. The vehicle washer defined in claim 5, wherein said adjustable means includes a timing relay.

References Cited
UNITED STATES PATENTS

| | | | |
|---|---|---|---|
| 2,583,703 | 1/1952 | Morison | 15—97 |
| 2,689,577 | 9/1954 | Dunn et al. | 134—123 |
| 2,756,759 | 7/1956 | Swain | 134—58 X |
| 3,088,472 | 5/1963 | Haines | 134—123 X |

CHARLES A. WILLMUTH, *Primary Examiner.*

R. L. BLEUTGE, *Assistant Examiner.*